United States Patent
Rastegar et al.

(10) Patent No.: US 10,031,222 B2
(45) Date of Patent: Jul. 24, 2018

(54) METHODS AND DEVICES FOR DETERMINING THE LOCATION OF REMOTELY EMPLACED OBJECTS, SUCH AS MUNITIONS

(71) Applicants: Jahangir S Rastegar, Stony Brook, NY (US); Harbans Dhadwal, Setauket, NY (US)

(72) Inventors: Jahangir S Rastegar, Stony Brook, NY (US); Harbans Dhadwal, Setauket, NY (US)

(73) Assignee: OMNITEK PARTNERS L.L.C., Ronkonkoma, NY (US)

(*) Notice: Subject to any disclaimer, the term of this patent is extended or adjusted under 35 U.S.C. 154(b) by 321 days.

(21) Appl. No.: 15/062,144

(22) Filed: Mar. 6, 2016

(65) Prior Publication Data
US 2016/0291120 A1  Oct. 6, 2016

Related U.S. Application Data

(60) Provisional application No. 62/129,792, filed on Mar. 7, 2015.

(51) Int. Cl.
*G01S 13/88* (2006.01)
*G01S 13/75* (2006.01)

(52) U.S. Cl.
CPC .......... *G01S 13/88* (2013.01); *G01S 13/751* (2013.01)

(58) Field of Classification Search
CPC ......... G01S 13/88; G01S 13/751; H04B 7/10; H01Q 21/245; H01Q 25/001

USPC ........................................................ 342/361
See application file for complete search history.

(56) References Cited

U.S. PATENT DOCUMENTS

| | | | |
|---|---|---|---|
| 7,239,275 B2 * | 7/2007 | Dybdal | H04B 7/10 342/159 |
| 8,175,763 B2 * | 5/2012 | Yamane | G05D 1/0653 244/180 |
| 9,134,412 B2 * | 9/2015 | Fireaizen | G01S 13/758 |
| 9,361,494 B2 * | 6/2016 | Swope | G06K 7/10366 |

* cited by examiner

*Primary Examiner* — Harry K Liu

(57) ABSTRACT

A method for determining a location of remotely emplaced objects. The method including: (a) scanning a field for one or more remotely emplaced objects with a reference source signal from a reference source; (b) detecting the signal at one or more orientation sensors associated with each of the one or more remotely emplaced objects; (c) determining an angular direction of each of the one or more remotely emplaced objects relative to the reference source based on the signal received at the one or more orientation sensors associated with each of the one or more remotely emplaced objects; (d) directing a range signal from the reference source towards each of the remotely emplaced objects at a corresponding determined angular direction; (e) in response to the range signal, transmitting a response signal from each of the remotely emplaced objects to the reference source; and (f) determining a range for each of the one or more remotely emplaced objects relative to the reference source at the determined angular direction based at least partially on the range and response signals.

20 Claims, 5 Drawing Sheets

METHODS AND DEVICES FOR DETERMINING THE LOCATION OF REMOTELY EMPLACED OBJECTS, SUCH AS MUNITIONS

CROSS REFERENCE TO RELATED APPLICATION

This application claims priority to U.S. Provisional Application No. 62/129,792, filed on Mar. 7, 2015, the entire contents of which are incorporated herein by reference.

BACKGROUND OF THE INVENTION

1. Field of the Invention

The present invention relates to determining the location of remotely emplaced objects, and in particular, to methods and devices for determining the location of remotely emplaced objects, such as munitions.

2. Prior Art

Geolocation and navigation in GPS denied environments, particularly indoors, has attracted the interest of researchers from very diverse fields. Many of the contemporary technologies are based on trilateration, triangulation, received signal strength, signal-of-opportunity, and frequency of arrival. The latter requires relative motion between the target and the known source. Trilateration requires highly accurate clocks and time synchronization, while triangulation requires precise knowledge of the distance between two sources and either distances or angles from these two sources to the target.

Pseudolites (ground-based pseudo-satellite transmitters) system was developed as a complementary technology to enhance the location resolution of aircraft on landing approach. Initially developed as an Integrity Beacon Landing System (IBLS), it is now being considered as a ground-based GPS equivalent to provide accurate location of a target. While this system is building on a mature technology, however, it inherits its shortcomings. In particular, the use of high power beacons is undesirable in a battlefield environment as it is immediately visible to an enemy. Furthermore, to provide the prerequisite time synchronization, the pseudolites are typically connected using wired technologies. Additionally, pseudolites require multiple transmitters positioned far enough apart to achieve the required remotely emplaced munitions (EM) geolocation accuracy.

Active or passive RFID positioning technologies are being incorporated into diverse environments, from the indoor office, to warehouse and outdoor (ship yards), primarily for tracking inventory movement. Geolocation information of moving or stationary targets requires tag readers which are located at geographically defined positions. While this technology is proving useful in a controlled environment, its utilization for geolocation of EMs is fraught with difficulties. It represents a medium power, short distance solution, typically requiring a large number of reader tags for accurate positioning. RFID readers and tags are omni-directional and thus require considerably more power during transmission compared with directional systems.

The 3D-ID system is envisioned as a GPS equivalent for a geographically defined local area that uses inexpensive tags. It has its own antenna infra-structure, currently developed for indoor applications, which can be deployed in outdoor environments. The system is organized into cells, which are managed by a controller, with up to 16 antennas connected by coax cables. The cell controller quickly cycles among antennas, determining distances to whichever of them are in range of the tag. The tag's location is determined from a minimum of three antenna fixes. Geolocation is based on the existence of digital maps of the building or the infrastructure. For the outdoor environment, coax cables could be replaced by a wireless link, but the technology is short range and heavily dependent on a large number of readers, which are essentially relatively high power and omnidirectional beacons, thereby making it unsuitable for many applications, including in the battlefield.

A Q-track system uses low frequency and near field electromagnetic ranging and has been demonstrated for short distance, wireless ground sensor network. Self-powered ad hoc network (SPAN) is a mesh network of self-organizing, self-healing sensors. SPAN systems, using low-frequency tags operating at 1 MHz, provide real time location resolution of 1 m with a maximum range of up to 25 m. These systems are primarily for indoor environments. In addition to the shortcoming of short operating distances, the RFID tags are typically large (e.g., 5.1 cubic inch). There does not appear to be a practical path to adaptation of this technology for EM geolocation application.

Wireless Local Area Network (WLAN), commonly known as Wi-Fi, is a widespread Radio Access Technology (RAT) used in wireless networks, such as, Blue tooth and Zig-Bee. Wi-Fi positioning techniques are based on a number of key technologies including Cell-ID, time, angle and RSSI.

Wireless Wi-Fi sensor networks (WSN) suffer from the lack of localization technologies. Localization is the process through which motes (a sensor network device) in a network are associated with their physical location rather than a network address. Self-localization of wireless motes is an enabling technology for both very large networks and for networks with movable motes. Automatic location discovery is also critical for "sprinkle deployments" desired for military and environmental monitoring applications. For many of these applications, cooperative localization between individual motes, rather than with base stations, is used to establish a mesh network. Deployment of wireless sensor node technology has some serious concerns in a non-cooperative battlefield environment. In particular, the geolocation of EMs will be based on the relative location of other EMs, potentially leading to large positional uncertainties. Main shortcoming of the WSN technology is the requirement of large number of widely dispersed base nodes outside as well as inside the deployment zone, thereby making them impractical for many applications, including in the battlefield.

UAV SAR based systems (or radar) capture the image of the region of interest based on back scattered signal. The most serious shortcoming of radar based technologies is the inability to discriminate the emplaced munitions from other similar sized objects on the ground. Other shortcomings include long set-up time and unacceptably long latency.

Acoustic (or ultrasonic) positioning systems have been used in mines and many indoor positioning applications. This approach relies on a small set of fixed anchors and a set of closely spaced beacons that can guarantee LOS transmission between the beacons and the target to be located. Time of flight measurements are used to determine distance, leading to location. These systems have a very limited range and accuracy and are very susceptible to countermeasures.

Laser based ranging and other methods relying on visual imaging do not present acceptable solutions since they cannot be operated in all-weather conditions and at night.

A number of direction finding (DF) methods have been developed for an object determining its general direction (bearing) relative to a beacon. Methods such as the so-called direction of arrival (DOA) or angle of arrival (AOA) measurement techniques have been well developed to provide such direction indicating information. The current technologies for DOA (or LOB) are basically crude indicators of the object's bearing and do not provide precise angle measuring systems. Thus, these methods do not provide the means for accurate geolocation.

Since the inception of RADAR, hardware associated with DF has seen some evolutionary changes. Most of the recent advances have been in the development of new algorithms, such as MUSIC, which can find directions of multiple objects. The physics behind DF and beam-forming has essentially remained unchanged. Early DF techniques were based on manual rotation of directional receiving antennas, surprisingly, these are still in use. Automated DF systems, based on four (or eight) symmetrically placed antennas on a rotating platform exploit the Doppler shift to measure the direction of the incoming signal. Watson-Watt designed an Adcock antenna, which has four equally spaced vertical elements, in E-W and N-S configuration, to compute the line of bearing (LOB) of an incoming signal. The Adcock pairs can be implemented using crossed ferrite loops, crossed dipole elements, crossed monopole elements and crossed loops. The fundamental drawbacks of the technology are the narrow operational frequency band-width, low angular resolution and the large antennas make it impractical for accurate geolocation.

Another method for LOB measurement uses linear (or circular) phased arrays, which require extensive computational resources. The length of the array determines the angular resolution. As a simple example, an angular resolution of one degree, at a frequency of 10 GHz, requires a linear array with a width of 24 meters. Clearly, such systems do not represent a practical solution for accurate geolocation.

Other antenna structures, known as smart antennas, are used in wireless communication systems, atop cellular towers. These antennas are arranged in a cluster to provide tracking coverage of users in range. Typically, the antennas are switched to track the object as it moves from one bearing sector to the next. For example, a six cluster antenna system gives a LOB width of 60 degrees. Such smart antennas have serious angular resolution shortcomings and are impractical for accurate geolocation.

SUMMARY OF THE INVENTION

The methods and devices disclosed herein combine direction of arrival polarized RF geometrical cavity orientation sensor technology with a fully electronic Scanning Polarized RF Reference Source (SPRS) to determine the angular direction of the remotely emplaced munitions (EM) in SPRS coordinate system with angular resolution better than 0.06 degrees (see below). Combined with a time of flight measurement, a single SPRS solution enables the discovery and geolocation of emplaced munitions with a precision better than 10 cm in a deployment zone greater than 10 km. Scanning polarized RF reference source technology is disclosed in U. S. Pat. Nos. 8,637,798, 8,446,577, and 8,259,292, the contents of each of which are incorporated herein by reference.

The two above referenced technologies, represent paradigm shifting solutions to the age old problem of direction finding. The Polarized RF Geometrical Cavity Orientation Sensors (PGCOS) provide a geometry based solution to determining the direction of arrival that breaks away from the traditional use of linear or circular phased arrays. PGCOS technology is disclosed in U.S. Pat. No. 7,425,918, the contents of which are incorporated herein by reference. The fully electronic Scanning Polarized RF Reference Source, which is formed by two synchronously modulated, linearly polarized RF waves, is revolutionary in its departure from the engrained method of adaptive electronic beam forming using phased arrays. High angular precision is possible because the angular measurements are mapped into time measurements which can be accomplished with very high precision. Fusion of these two technologies leads to innovative solutions that can be leveraged for minimum power and stealth, while providing tracking and continuous access to the emplaced munitions and to the host station at distances exceeding 10 km.

The baseline performance characteristics of the methods and devices disclosed herein include:

1. With one fully electronic Scanning RF Polarized Reference Source (SPRS), the capability to discover and establish a point-to-point RF communication with all the emplaced munitions within a deployment zone of 10 km or larger.

2. Centimeter resolution through innovative mapping of angular information into the time domain, to exploit the high precision timing capabilities that exist. This high timing precision is achieved without imposing strict time synchronization constraints.

3. Provides a user with a visual map of the object deployment zone, which is regularly updated; to detect and alert of any unauthorized object movement or tampering. In the case of EM's, allows the operator to deactivate EMs to create a path through which man and equipment can safely pass; and direct personnel for EM extraction.

4. High accuracy angular orientation measurement capability enables the host station to track authorized as well as unauthorized movement of the objects. Additionally, the system allows the host station to detect any tampering with the object since the host knows the Object location as well as its "heading" (rotational orientation) at the time of emplacement/deployment.

5. The SPRS uses narrow band sources with directional and polarized pulsed waves. This combination reduces the power by orders of magnitudes as compared to omnidirectional and continuous transmission systems.

6. A further advantage of (5) is the negligible strength of the RF emission beyond the deployed zone, making detection by the enemy extremely unlikely.

7. Another power reducing feature enables optimization of transmission power based on the quality of the point-to-point link between the SPRS and the individual emplaced munitions.

8. The SPRS transmits vertically polarized waves. As a result, ground reflections become negligible. This would add increased sensitivity to the sensors of the emplaced objects.

9. An encrypted, high speed, point-to-point, wireless link can be established with the host station for communication as needed.

10. As the SPRS uses directional cavity antennas, it can operate close to the ground making it easier to conceal.

11. Each emplaced object has several multi-cavity PGCOS which can be integrated into the external structure of the emplaced object, permitting the electronics to meet a space requirement of 1 cubic inch.

12. Multi-cavity PGCOS enable individual emplaced objects to establish a directional link with the SPRS. This further reduces the power requirements and increases the signal to noise ratio.

13. Directional point to point links, which include an active return signal, eliminate multipath fading.

14. Since the SPRS has a very low profile with no protruding antennas the handling overhead and accidental damage is minimal.

15. The SPRS provides programmable capability to periodically monitor the unauthorized movement of the emplaced objects, and thus an accurate map of the emplaced objects is always available to the host.

16. The patterned modulation allows operation at signal to noise ratios below unity, thereby allowing the pulsed signal to be hidden in the environmental noise.

17. Multiple power saving features included in the system can provide operation for up to 30 days and full electronic design ensures shelf life of over 20 years.

18. The system can be deployed and operated in all weather conditions, including non-line-of-sight conditions.

Polarized RF Geometrical Cavity Orientation sensors (PGCOS) together with a single Scanning Polarized RF Reference Source can provide the means of measuring angular orientation of fixed or moving objects located tens or even hundreds of kilometers from the referencing source with very high precision. These geometrical cavity sensors are positioned on the object (such as EMs) and can be designed to be very sensitive to a desired orientation. Together the PGCOS and the SPRS can measure the orientation of the object in the coordinate system of the SPRS. The distance from the referencing source to the object, i.e., the object range can also be measured using well known time of flight techniques. The location of all objects can then be located in the coordinate system of the referencing source.

Accordingly, a method for determining a location of remotely emplaced objects is provided. The method comprising: (a) scanning a field for one or more remotely emplaced objects with a reference source signal from a reference source; (b) detecting the signal at one or more orientation sensors associated with each of the one or more remotely emplaced objects; (c) determining an angular direction of each of the one or more remotely emplaced objects relative to the reference source based on the signal received at the one or more orientation sensors associated with each of the one or more remotely emplaced objects; (d) directing a range signal from the reference source towards each of the remotely emplaced objects at a corresponding determined angular direction; (e) in response to the range signal, transmitting a response signal from each of the remotely emplaced objects to the reference source; and (f) determining a range for each of the one or more remotely emplaced objects relative to the reference source at the determined angular direction based at least partially on the range and response signals.

The method can further comprise building a map of a position of the one or more remotely emplaced objects based on the determined angular direction and range for each of the one or more remotely emplaced objects.

The method can further comprise each of the one or more remotely emplaced objects transmitting a unique identity code.

The method can further comprise, prior to step (a), transmitting a wake up signal from the reference source to each of the one or more remotely emplaced objects. In which case the method can further comprise, subsequent to the transmitting of the wake up signal, switching the one or more remotely emplaced objects from a dormant mode.

Step (a) can comprise scanning at stepped power levels, from a minimum power level to a maximum power level. In which case, the method can further comprise continuing the scanning until all of the one or more remotely emplaced objects respond with an activation signal. The activation signal can provide an identification code and a received signal quality. The method can further comprise selecting a minimal transmitter power level for each of the one or more remotely emplaced objects having the identification code based on the received signal quality. The range signal for each of the remotely emplaced objects is transmitted at the minimum required power level.

The range for each of the one or more remotely emplaced objects relative to the reference source at the determined angular direction can be based on a time of flight of the range and response signals. The range for each of the one or more remotely emplaced objects relative to the reference source at the determined angular direction can be further based on a known processing delay at the one or more remotely emplaced objects.

The response signal can further include a unique identity code.

The method can further comprise, subsequent to step (f), transmitting one or more commands to one or more of the one or more remotely emplaced objects at the minimum required power level.

The method can further comprise updating the map at predetermined intervals using the reference source.

The reference source can comprise two or more reference sources and the method can further comprise repeating steps (a)-(f) for each of the two or more reference sources. In which case, the method can further comprise building a map of a position of the one or more remotely emplaced objects based on the determined angular direction and range for each of the one or more remotely emplaced objects for each of the two or more reference sources.

The method can further comprise sending the angular direction and range from the reference source for each of the one or more remotely emplaced objects to another of the one or more remotely emplaced objects.

The reference source signal can be a polarized RF reference source signal.

The one or more orientation sensors can comprise one or more polarized RF orientation sensors.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

While the present methods and devices for determining the location of remotely emplaced objects may have particular utility with regard to determining the location of remotely emplaced munitions, such methods and devices for determining the location of remotely emplaced objects also have utility in determining the location of other objects, such as construction equipment, live animals/people (such as pets and toddlers), tracking and controlling driverless cars, collision avoidance systems for cars (whether or not they are driverless), whether such objects move with time or are fixed for certain periods. Thus, without limiting the applicability of the methods and devices for determining the location of remotely emplaced objects to munitions, the present disclosure will discuss embodiments with regard to determining the location of remotely emplaced munitions (EM).

Figure 1A:
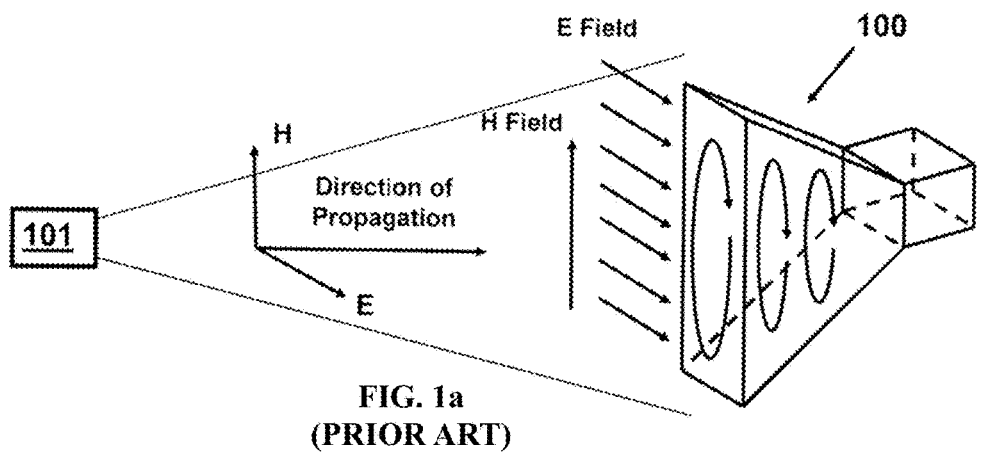
FIG. 1a illustrates a polarized RF geometrical cavity orientation sensor for use in the system and methods described herein.

Briefly, referring to FIG. 1a, there is shown a representation of a waveguide sensor (PGCOS) 100 and its operation with respect to a polarized radio frequency (RF) reference (illuminating) source 101. An electromagnetic wave consists of orthogonal electric (E) and magnetic (H) fields. The electric field E and the magnetic field H of the illuminating beam are mutually orthogonal to the direction of propagation of the illumination beam. When polarized, the planes of E and H fields are fixed and stay unchanged in the direction of propagation. Thus, the illuminating source establishes a (reference) coordinate system with known and fixed orientation. The waveguide 100 reacts in a predictable manner to a polarized illumination beam. When waveguides are provided on a body of an object, and when the object is positioned at a known distance from the illuminating source, the amplitudes of the signals received by the waveguide sensor 100 can be used to determine the orientation of the object relative to the reference (illuminating) source 101, i.e., in the aforementioned reference coordinate system of the reference source 101. The requirement for the proper distribution of the waveguide sensors 100 over the body of the object is that at least three of the waveguides be neither parallel nor co-planar.

Figure 1B:
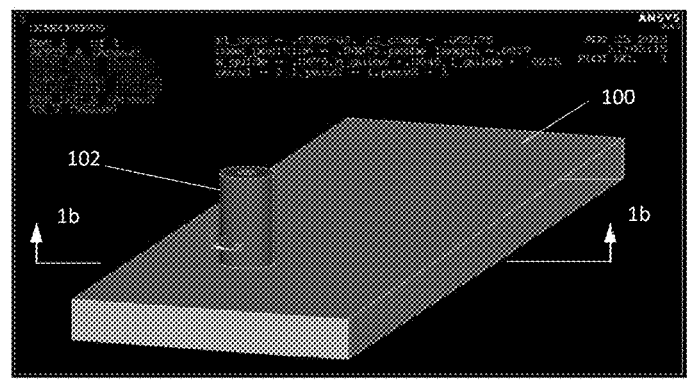
FIG. 1b illustrates a solid model of the polarized RF geometrical cavity orientation sensor of FIG. 1 having a coaxial probe positioned in a cavity thereof.
Figure 1C:
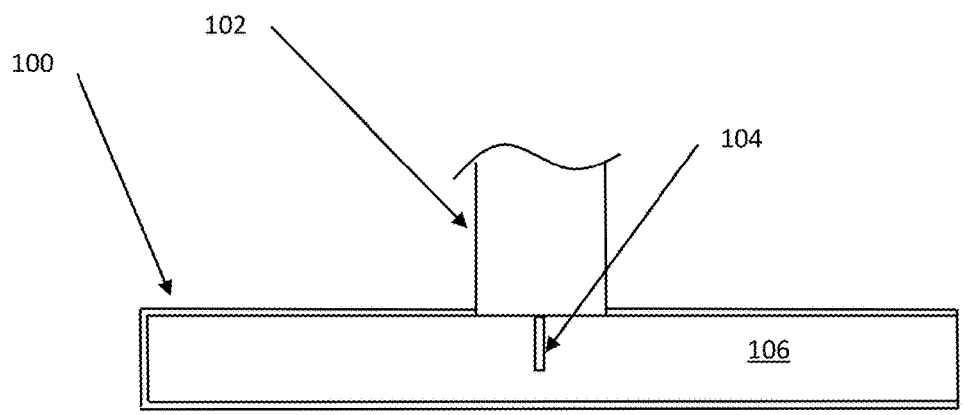
FIG. 1c illustrates a schematic sectional view of FIG. 1a as taken along cross-section lines 1b-1b.
Figure 2:
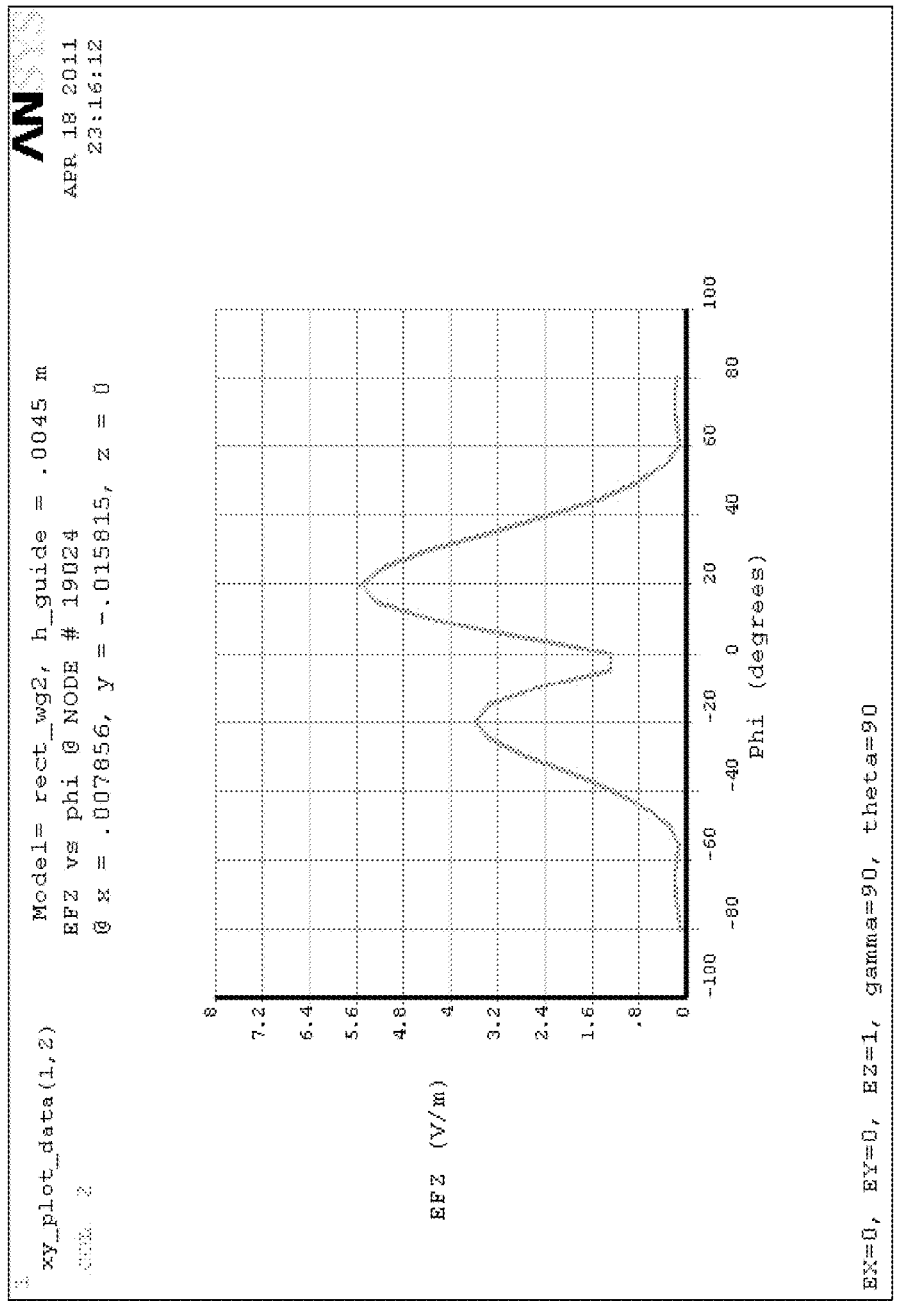
FIG. 2 illustrates a plot of expected azimuth angular response, as measured by a voltage at an output of the terminal of the polarized RF geometrical cavity orientation sensor.
Figure 3:
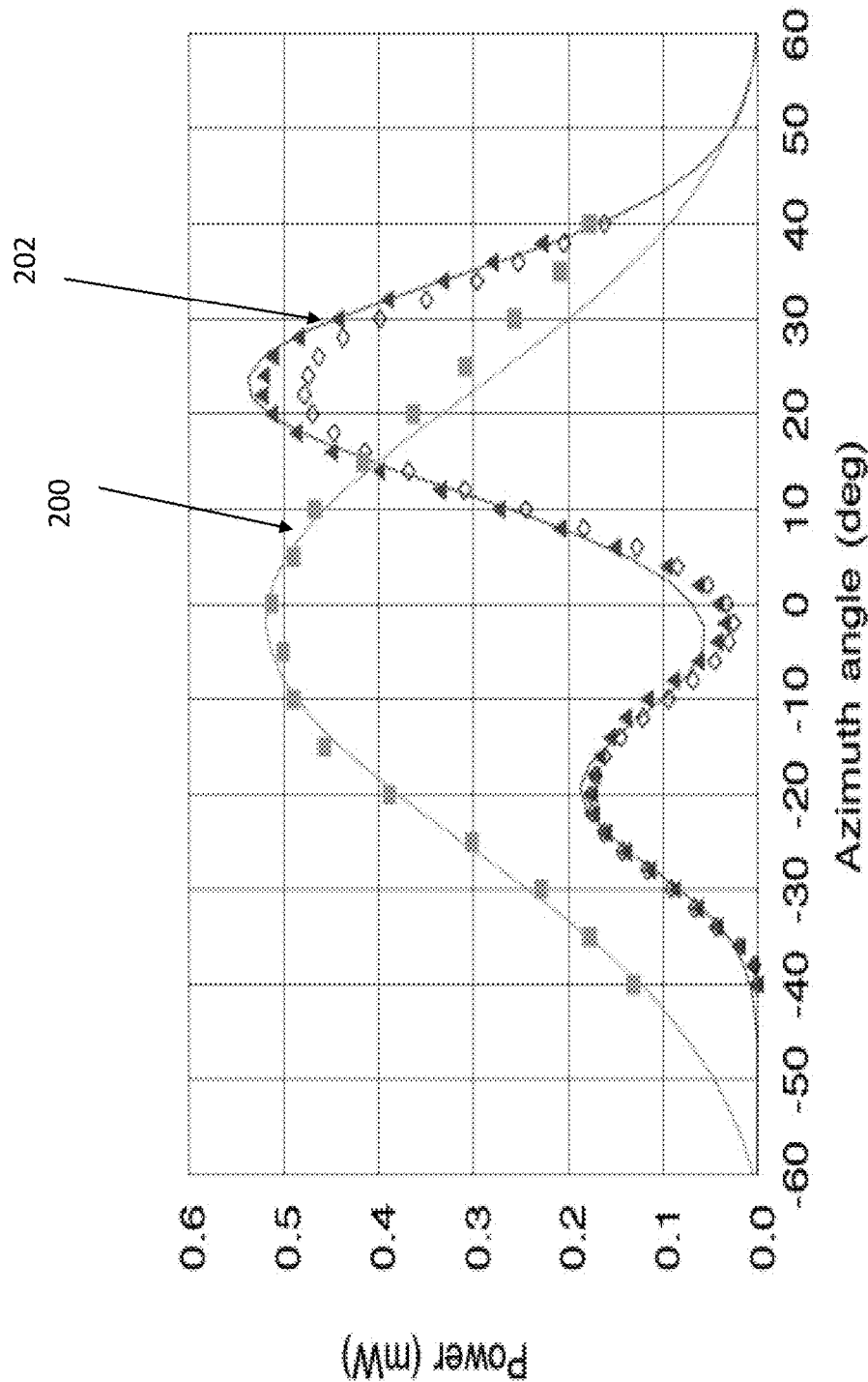
FIG. 3 illustrates a plot of angular response of the polarized RF geometrical cavity orientation sensor in an anechoic chamber with a comparison of an angular response of a standard 3-dB pyramidal horn antenna.

Similarly, the orientation sensors in the present system are geometrical cavities with one or more pick up terminals that are designed to provide output that varies with orientation of the sensor with respect to the direction of the incoming polarized RF plane of polarization. Finite Element (FE) modeling and Finite Element Analysis (FEA) software is used for modeling sensor structures and their interaction with RF waves. Furthermore, software can be added to FE modeling and FEA software to allow extraction of angular orientation sensitivity of geometrical cavity sensors to incoming polarized RF waves. As an example, a PGCOS 100 is used to have an asymmetric response in the azimuth plane, with a +/−10 degree tolerance to elevation misalignment. FIG. 1b shows a model of a PGCOS design used for performance optimization, which includes terminal positioning as one of design parameters, as well as, maximum sensitivity and minimal cross-sensitivity. The optimally obtained sensor design is illustrated in FIG. 1b, and has a rectangular cavity defined by a width of 2.25λ, a height of 0.15λ and a length of 0.75λ. The optimal location of the terminal is found to be located to one side of the center line. A cross section of the PGCOS 100 of FIG. 1b is shown schematically in FIG. 1c having a coaxial cable 102 with central conductor probe 104 disposed within the cavity 106. The expected azimuth angular response, as measured by the voltage at the output of the terminal, is illustrated in FIG. 2. Angular response of the PGCOS was measured in an anechoic chamber and the results are plotted in FIG. 3 (line 200), which also shows a comparison with the angular response of a standard 3-dB pyramidal horn antenna (line 202).

A fully electronic Scanning Polarized RF Reference Source (SPRS), which comprises two vertically polarized RF waves, is based on paradigm shifting concepts. The methods and devices disclosed herein combine the amplitude modulation of the two polarized waves to produce a time varying power fluctuation (pattern) in the PGCOS (described above). Non-linear signal processing techniques are then used to determine angular position of the PGCOS in the coordinate system of the SPRS with very high precision. Mapping of the angular information into a power fluctuating pattern makes the measuring system very robust. Indeed, known non-linear signal processing techniques can be used to recover the angle, even when signal-to-noise ratio of the measured RF signal is below unity. In other words, a signal pattern can be hidden in the environmental noise, making the system immune to all countermeasures. High angular precision is possible due to the complex modulation patterns, and mapping of the angular space to the time domain. With off-the shelf components time measurement accuracy has been shown to be very accurate, such as better than 0.1%. Thus, angle accuracy, which is proportional to time, is also very accurate, such as better than 0.06° for a scan range of +/−30°.

The RF scanning reference source transmits vertically polarized waves. As a result, ground reflections become negligible. This adds increased sensitivity to the sensors of the emplaced objects, such as munitions.

The above techniques have been used for developing a Polarized RF scanning source for measurement of roll angle of objects. In this case, two orthogonal polarization states are used and amplitude modulated to define a time varying linear polarization vector. This reference source illuminates the PGCOS discussed above. System testing has been performed both in an anechoic chamber and in realistic field conditions.

Figure 4:
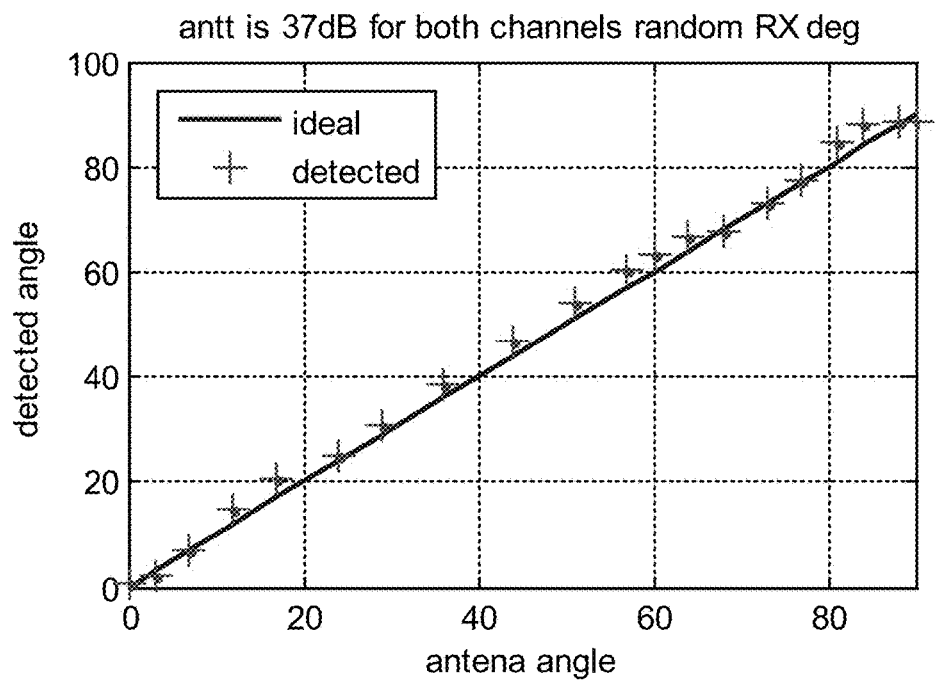
FIG. 4 illustrates a plot of data for the polarized RF geometrical cavity orientation sensor obtained over a roll angle range from 10 degrees to 80 degrees.

A dual polarization, 18 dB, horn was used to transmit the two amplitude modulated linearly polarized RF waves at 10 GHz. Measurements were done at various roll positions and the angle of the sensor relative to the SPRS was extracted through non-linear signal processing of the measured scan response. FIG. 4 summarizes the data obtained over a roll angle range from 10 degrees to 80 degrees. High accuracy surveying angle measurement equipment can be used to provide precision angular referencing.

The methods and devices disclosed herein for geolocation of emplaced munitions is based on the two key technologies described above. Together these technologies present a novel solution which requires a single low power highly directional Scanning RF Polarized Reference Source, while all contemporary technologies need to employ a minimum of three higher power omnidirectional beacons. A single SPRS maintains a dynamic map of the geolocation of the emplaced objects, such as emplaced munitions (EM) in a deployment zone that can exceed 10 kilometers. Each of the munitions (or other objects to be located) has integrated Polarized Geometrical Cavity Orientation Sensors (PGCOS) and establishes a point-to-point communication link with the SPRS.

The high accuracy angular orientation measurement capability of the system and devices disclosed herein enable the host station to track authorized as well as unauthorized movement of the emplaced objects, such as EM. Additionally, the system allows the host station to detect any tampering with the emplaced objects, such as EM, since the host knows the emplaced objects, such as the EM, location as well as its "heading" (rotational orientation) at the time of emplacement/deployment. Furthermore, at short notice, the host station can create a safe path through the deployment zone by deactivating appropriate emplaced objects, such as EMs. This feature also enables safe and rapid clearing of the deployed emplaced objects, such as EMs.

The methods and devices disclosed herein can provide the user, such as the warfighter with a visual map of the emplaced objects, such as EM, deployment zone, which can be regularly updated; can detect and alert of any unauthorized emplaced objects, such as EM, movement or tampering; would allow the operator to deactivate the emplaced objects, such as EM's, to create a path through which man and equipment can safely pass; and direct personnel for extraction of the emplaced objects, such as EM.

Three variations of the methods and devices disclosed herein are provided below for the geolocation of emplaced objects, such as munitions, which can be in a GPS denied environment.

Figure 5:
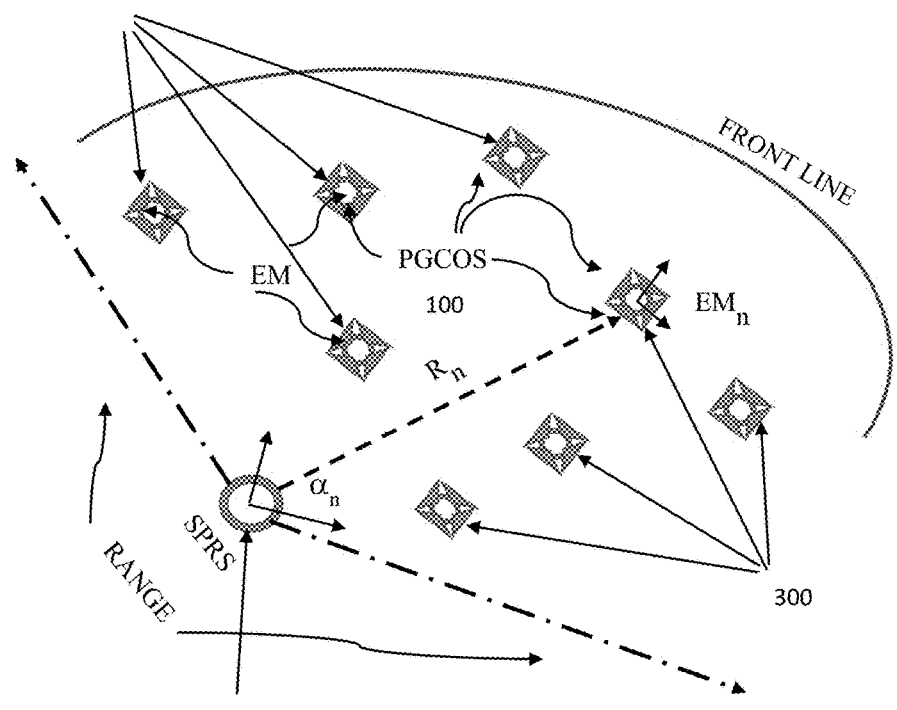
FIG. 5 illustrates a random deployment of emplaced objects with a single Scanning Polarized RF Reference Source.

FIG. 5 shows a random deployment of the emplaced objects 300, in the form of EMs, with a single Scanning Polarized RF Reference Source (SPRS) 400, in which the position of the SPRS 400 is known to a host station. Each of the EM's include a one or more PGCOS 100, either placed in a predetermined pattern or randomly positioned thereon. It is appreciated that the SPRS may be an integral part of the host station or may be linked to it using various communication techniques. The PGCOS's for each EM 300 is/are associated with a processor and a transceiver, either stand alone for use solely with the PGCOS and for communication with the SPRS 400 or shared with the object being emplaced (e.g., if the munition or other object being emplaced uses its own processor and/or transceiver, the same can have dual use for use in carrying out operations of the object (EM 300) and for use in the methods disclosed herein). The SPRS 400 is located in a friendly zone and does not need to be very close to the zone in which the EM's 300 are located. Through the use of pulsed, polarized transmission and burst communication, the system has an extremely low probability of detection by the enemy. Furthermore, the use of directional antennas in the SPRS and the EMs, reduces the probability of enemy detection to negligible levels.

Subsequent to deployment, or at any time after deployment, the host station instructs the SPRS to discover or update the geolocation table of all the EMs 300. Each EM geolocation is determined first by determining the angular direction $\beta_n$ of the EM 300 in an SPRS coordinate system and then determining the distance between the EM 300 and the SPRS 400 (range $R_n$) using a time of flight technique, following the steps described below. The angular direction $\beta_n$ is ascertained, with high precision (e.g., 0.06 degrees), using non-linear signal processing techniques which match measured power fluctuation patterns to extract the angular location.

The EMs 300 are identified with a unique identity code and are equipped with one or more multi-cavity PGCOS 100, which ensures that each EM 300 is guaranteed to receive a signal when illuminated by the SPRS 400, independent of its initial orientation during deployment. PGCOS 100, by design, are tolerant to considerable angular misalignment with the plane of horizon during deployment. As discussed above, the SPRS 400 has the capability to rapidly scan the deployment zone for the EMs 300. The discovery and geolocation of the EMs 300 follows the protocol described below.

First, the measurement of the angular direction of the EMs with be described. During the initial discovery mode, upon receiving a prompt from a host controller, the SPRS 400 using a rapid scan sends a wake up signal to all EMs 300. All EMs 300 switch from the dormant mode used following emplacement. This is essentially a wake-up call.

The SPRS 400 performs a rapid sweep of the deployment zone at stepped power levels, from minimum to maximum, until all EMs 300 have been accounted for. The pulsed transmission and stepped power levels, ensures that the SPRS 400 remains hidden from the enemy. Polarization adds another layer of stealth and reduces power requirements further. During this mode, EMs 300 that lie within small ranges of angular direction in the coordinate system of the SPRS 400 will respond back to the SPRS 400, identify themselves and indicate the received signal quality.

At the end of the general angular direction search, the SPRS 400 will execute a narrower search for precision measurement of each angular direction of each EM 300. The narrower search, together with, signal quality can serve to separate the closely spaced EMs 300. It should also be noted that there is zero probability of neighboring EMs 300 acting upon instruction intended for neighboring EMs 300 as each EM 300 has a unique ID.

At the end of the full sweep, the SPRS 400 has an angular mapping of all Ems 300, along with the corresponding link quality factor, which enables the SPRS 400 to select minimal transmitter power level for each EM 300.

Next, the range determination of the EMs will be discussed. The SPRS 400 determines the range to each of the EMs 300 by sending a short modulated pulse to the targeted EM 300 at the measured angular direction of the EM 300 at the minimum required power level. The EM 300 upon receiving the pulse generates a modified pulse which is transmitted back to the SPRS 400. The SPRS 400 uses the time of flight, accounting for the known processing delay at the EM 300. The range accuracy is directly proportional to the time jitter of the oscillator in the SPRS 400. For example, a distance resolution of 10 cm at a range of 1 km requires a timing precision of $10^{-4}$. This simple example corresponds to a timing accuracy of 3 ns. This procedure for determining the range is insensitive to multipath effects, and spurious reflections from other nearby objects, as the targeted EM 300 is the only source of the returned pulse, there are no other EMs 300 in the direct path and a highly directional link ensures high isolation from oblique sources of energy. The EM 300 may also add its unique ID to the returned signal. Thus for the maximum indicated range of 10 km, a timing accuracy of 30 ns (which is readily available with current technology) will give a range resolution significantly better than 10 cm. Range accuracy is even higher when correlation of the transmitted and received pulses is used to measure the time of flight.

The SPRS transmits the range information back to the EM 300 for further optimization of the communication link in terms of power utilization in the EM 300. The SPRS 400 repeats the above two steps for each of the EMs 300 in the deployment zone.

Finally, the geolocation of EMs will be discussed using the determined angular direction and range. Using the angular direction and range measurements, the SPRS 400 generates a high accuracy geolocation map of all the EMs 300 in the deployment zone. This information is transmitted to the host station. Subsequently, commands from the host controller can be directed to any single EM 300 with minimal power. The host station automatically and regularly updates the geolocation map using the above steps.

Deployment of additional SPRSs 400 in the emplacement zones adds the following enhancements to the system. The integrity of the system is not compromised in the event of a SPRS 400 failure or damage, and the geolocation map of the deployed EMs 300 is still available to the host station. Multiple geolocation maps constructed by each SPRS 400 increases accuracy and reliability. Robustness is increased through redundancy. The additional SPRS 400 permits further reduction in the power requirements, through shared knowledge of the link signal quality with a particular EM 300. Control signals to a particular EM 300 are routed through the link with the highest signal quality factor.

Once discovery of all EMs 300 has been made, the SPRS 400 can send location information (relative heading and range) of the nearest neighbors to all of the EMs 300. This adds a degree of autonomy to each of the EMs 300, which can be equipped to sense the local environment and relay the information to its neighbors as well as to the SPRS 400. This enhancement allows rapid exchange of information between nearest neighbors, enabling efficient use of EMs 300 to neutralize enemy encroachment.

As discussed above, although the methods and devices disclosed herein are disclosed with regard to emplaced munitions, such methods and devices have applicability in other emplaced objects, such as in finding and communicating with unattended articles. That is, any article which is placed in a certain location and left unattended over a period of time can be later found/communicated with using the RF sensor technology disclosed herein. Some examples of unattended articles may be survey markers, construction equipment, buoys and the like.

Furthermore, the methods and devices disclosed herein can also have widespread use in tracking mobile articles. That is, any article, including live animals/people which move with time can be tracked using the RF sensor technology described herein. Some examples include tracking and controlling driverless cars, collision avoidance systems for cars (whether or not they are driverless), locating toddlers/pets and the like.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for determining a location of remotely emplaced objects, the method comprising:
   (a) scanning a field for one or more remotely emplaced objects with a reference source signal from a reference source;
   (b) detecting the signal at one or more orientation sensors associated with each of the one or more remotely emplaced objects;
   (c) determining an angular direction of each of the one or more remotely emplaced objects relative to the reference source based on the signal received at the one or more orientation sensors associated with each of the one or more remotely emplaced objects;
   (d) directing a range signal from the reference source towards each of the remotely emplaced objects at a corresponding determined angular direction;
   (e) in response to the range signal, transmitting a response signal from each of the remotely emplaced objects to the reference source; and
   (f) determining a range for each of the one or more remotely emplaced objects relative to the reference source at the determined angular direction based at least partially on the range and response signals.

2. The method of claim 1, further comprising building a map of a position of the one or more remotely emplaced objects based on the determined angular direction and range for each of the one or more remotely emplaced objects.

3. The method of claim 1, further comprising each of the one or more remotely emplaced objects transmitting a unique identity code.

4. The method of claim 1, further comprising, prior to step (a), transmitting a wake up signal from the reference source to each of the one or more remotely emplaced objects.

5. The method of claim 4, further comprising, subsequent to the transmitting of the wake up signal, switching the one or more remotely emplaced objects from a dormant mode.

6. The method of claim 1, wherein step (a) comprises scanning at stepped power levels, from a minimum power level to a maximum power level.

7. The method of claim 6, further comprising continuing the scanning until all of the one or more remotely emplaced objects respond with an activation signal.

8. The method of claim 7, wherein the activation signal provides an identification code and a received signal quality.

9. The method of claim 8, further comprising selecting a minimal transmitter power level for each of the one or more remotely emplaced objects having the identification code based on the received signal quality.

10. The method of claim 9, wherein the range signal for each of the remotely emplaced objects is transmitted at the minimum required power level.

11. The method of claim 1, wherein the range for each of the one or more remotely emplaced objects relative to the reference source at the determined angular direction is based on a time of flight of the range and response signals.

12. The method of claim 11, wherein the range for each of the one or more remotely emplaced objects relative to the reference source at the determined angular direction is further based on a known processing delay at the one or more remotely emplaced objects.

13. The method of claim 1, wherein the response signal further includes a unique identity code.

14. The method of claim 10, further comprising, subsequent to step (f), transmitting one or more commands to one or more of the one or more remotely emplaced objects at the minimum required power level.

15. The method of claim 2, further comprising updating the map at predetermined intervals using the reference source.

16. The method of claim 1, wherein the reference source comprises two or more reference sources and further comprising repeating steps (a)-(f) for each of the two or more reference sources.

17. The method of claim 16, further comprising building a map of a position of the one or more remotely emplaced objects based on the determined angular direction and range for each of the one or more remotely emplaced objects for each of the two or more reference sources.

18. The method of claim 1, further comprising sending the angular direction and range from the reference source for each of the one or more remotely emplaced objects to another of the one or more remotely emplaced objects.

19. The method of claim 1, wherein the reference source signal is a polarized RF reference source signal.

20. The method of claim 19, wherein the one or more orientation sensors comprise one or more polarized RF orientation sensors.

* * * * *